US012572104B2

(12) United States Patent
Yamamoto

(10) Patent No.: US 12,572,104 B2
(45) Date of Patent: Mar. 10, 2026

(54) SHEET STORAGE DEVICE AND IMAGE FORMING APPARATUS

(71) Applicant: Kazuya Yamamoto, Kanagawa (JP)

(72) Inventor: Kazuya Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/631,573

(22) Filed: Apr. 10, 2024

(65) Prior Publication Data

US 2024/0345528 A1 Oct. 17, 2024

(30) Foreign Application Priority Data

Apr. 14, 2023 (JP) ................................ 2023-066540

(51) Int. Cl.
*G03G 15/00* (2006.01)
*G03G 21/16* (2006.01)

(52) U.S. Cl.
CPC ..... *G03G 15/6555* (2013.01); *G03G 21/1633* (2013.01); *G03G 2215/00354* (2013.01); *G03G 2221/1678* (2013.01)

(58) Field of Classification Search
None
See application file for complete search history.

(56) References Cited

U.S. PATENT DOCUMENTS

| | | | | |
|---|---|---|---|---|
| 2,498,139 A * | 2/1950 | Simjian | ...................... | A47F 3/12 312/226 |
| 2013/0140762 A1* | 6/2013 | Washino | ................ | B65H 1/266 271/145 |
| 2015/0239687 A1 | 8/2015 | Shinkawa et al. | | |
| 2024/0051775 A1 | 2/2024 | Yamamoto | | |

FOREIGN PATENT DOCUMENTS

| | | | | |
|---|---|---|---|---|
| EP | 1804132 A1 * | 7/2007 | ......... | G03G 15/6502 |
| JP | 9-175662 A | 7/1997 | | |
| JP | 2006-290581 A | 10/2006 | | |
| JP | 2017-030897 A | 2/2017 | | |
| JP | 2022-011084 A | 1/2022 | | |

* cited by examiner

*Primary Examiner* — Leslie J Evanisko
(74) *Attorney, Agent, or Firm* — Harness, Dickey & Pierce, P.L.C.

(57) ABSTRACT

A sheet storage device includes a sheet storage, a handle, a cover, and a handle holder. The sheet storage is insertable into and removable from an apparatus body. The handle is for insertion and removal of the sheet storage into and from the apparatus body. The cover is attached in front of the sheet storage in a removal direction of the sheet storage. The handle holder holds the handle on the sheet storage, is disposed between the cover and the sheet storage, and has a restrictor that restricts deformation of the cover toward the sheet storage.

11 Claims, 11 Drawing Sheets

SHEET STORAGE DEVICE AND IMAGE FORMING APPARATUS

CROSS-REFERENCE TO RELATED APPLICATION

This patent application is based on and claims priority pursuant to 35 U.S.C. § 119 (a) to Japanese Patent Application No. 2023-066540, filed on Apr. 14, 2023, in the Japan Patent Office, the entire disclosure of which is hereby incorporated by reference herein.

BACKGROUND

Technical Field

Embodiments of the present disclosure relate to a sheet storage device and an image forming apparatus.

Related Art

A sheet storage device is known that includes a sheet storage that is insertable into and removable from an apparatus body, a handle that is operated by a user when the sheet storage is inserted into and removed from the apparatus body, and a cover that is attached to a front of the sheet storage in a removable direction of the sheet storage.

SUMMARY

In an embodiment of the present disclosure, there is provided a sheet storage device that includes a sheet storage, a handle, a cover, and a handle holder. The sheet storage is insertable into and removable from an apparatus body. The handle is for insertion and removal of the sheet storage into and from the apparatus body. The cover is attached in front of the sheet storage in a removal direction of the sheet storage. The handle holder holds the handle on the sheet storage, is disposed between the cover and the sheet storage, and has a restrictor that restricts deformation of the cover toward the sheet storage.

In another embodiment of the present disclosure, there is provided an image forming apparatus that includes the sheet storage device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
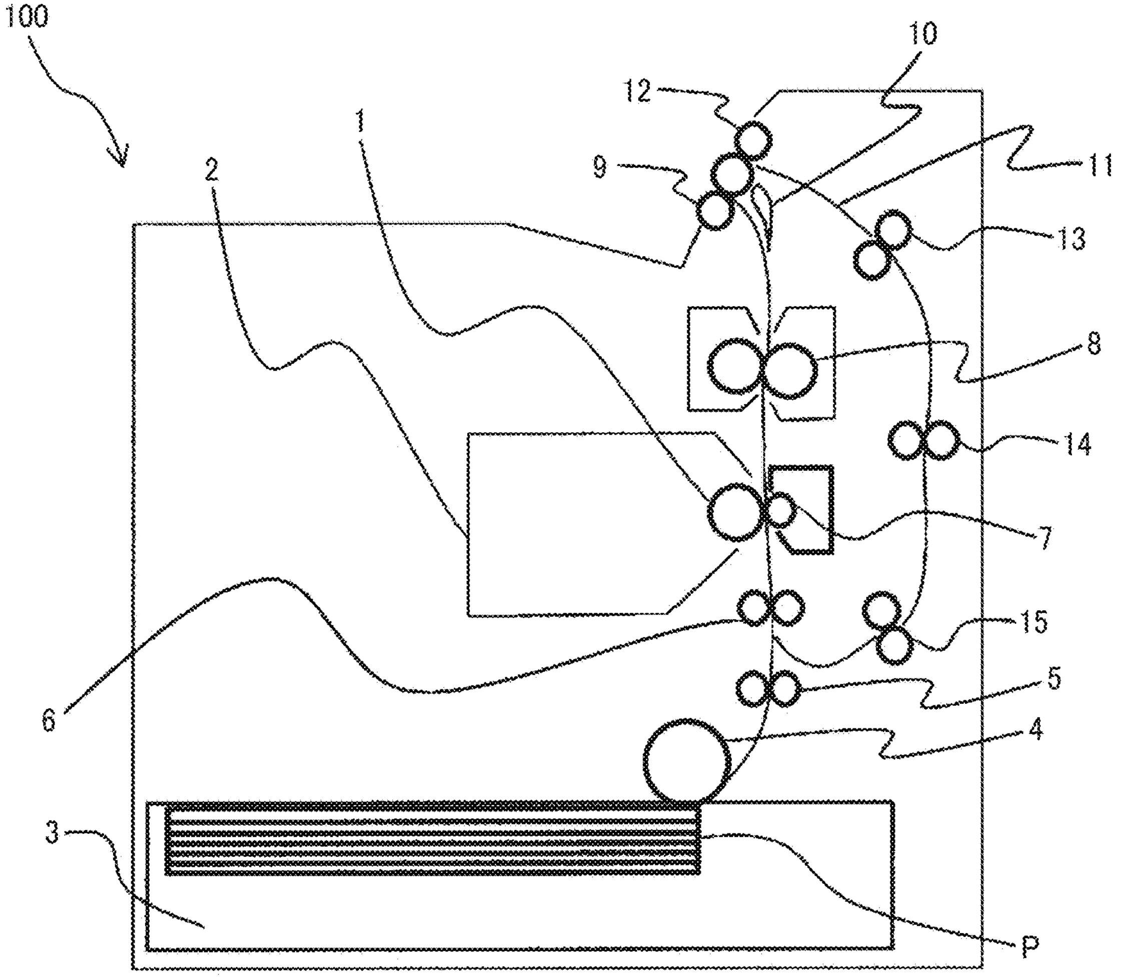
FIG. 1 is a schematic view of a printer as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given of an electrophotographic printer that serves as an image forming apparatus including a sheet storage device according to an embodiment of the present disclosure and forms images by electrophotography. In the following description, the electrophotographic printer is simply referred to as a printer. The present embodiment is an example in which a sheet storage device according to an embodiment of the present disclosure is applied to a sheet storage device of an electrophotographic image forming apparatus, but is also applicable to image forming apparatuses of other methods (e.g., inkjet methods), or apparatuses other than image forming apparatuses.

FIG. 1 is a schematic view of a printer 100 as an image forming apparatus according to an embodiment of the present disclosure. The printer 100 illustrated in FIG. 1 is a monochrome printer, and includes an image forming device 2 in an apparatus body. The image forming device 2 includes, for example, a photoconductor 1 as an image bearer to bear an image on a surface thereof, a charging roller as a charging device to charge the surface of the photoconductor 1, a developing device to develop a latent image on the photoconductor 1 into a visible image, and a cleaning blade as a cleaning device to clean the surface of the photoconductor 1. A light-emitting diode (LED) head array is disposed around the photoconductor 1. The LED head array serves as an exposure device to expose the surface of the photoconductor 1.

When image formation starts, the photoconductor 1 of the image forming device 2 rotates counterclockwise in FIG. 1, and the charging roller uniformly charges the surface of the photoconductor 1 in a specified polarity. The LED head array irradiates the charged surface of the photoconductor 1 with a light beam based on image data input from an external device. Thus, an electrostatic latent image is formed on the surface of the photoconductor 1. The electrostatic latent image formed on the photoconductor 1 is developed into a toner image (visible image) with toner supplied by the developing device.

As the image formation starts, a transfer roller 7 rotates, and the specified voltage, which is either direct current (DC) voltage or alternating current (AC) voltage, or includes both, is applied to the transfer roller 7, thus forming a transfer electrical field between the transfer roller 7 and the photoconductor 1.

In a lower portion of the apparatus body, a feed roller 4 starts rotating, and the sheet P is fed out from a sheet feeder 3 as a sheet storage device. The fed sheet P is conveyed by a conveying roller pair 5 and conveyance is temporarily stopped by a registration roller pair 6. Thereafter, the rotation of the registration roller pair 6 is started at a specified timing, and the sheet P is conveyed to a transfer nip between the photoconductor 1 and the transfer roller 7 in synchronization with the timing at which the toner image on the photoconductor 1 reaches the transfer nip. The toner image on the photoconductor 1 is transferred onto the sheet P by a transfer electric field. Residual toner that remains on the photoconductor 1 without being transferred onto the sheet P is removed by the cleaning blade.

After the toner image is transferred onto the sheet P, the sheet P is conveyed to the fixing device 8 to fix the toner image to the sheet P. The sheets P are ejected to the outside of the apparatus by an output roller pair 9 and are stacked on an output tray.

The printer 100 according to the present embodiment includes a branching plate 10 of a claw shape in cross section for changing the conveyance direction of a sheet P and a reversing roller pair 12 for feeding the sheet P to a reverse conveyance path 11 in order to form images on both faces of the sheet P. One roller of the reversing roller pair 12 also serves as one roller of the output roller pair 9. The reverse conveyance path 11 is provided with a duplex entrance roller pair 13, a duplex intermediate roller pair 14, and a duplex exit roller pair 15.

In a case where images are formed on both sides of the sheet P, the branching plate 10 is rotated to switch the position of the branching plate 10 before the sheet P is conveyed from the fixing device 8 to the output roller pair 9. As a result, the conveyance route of the sheet P on which an image is formed on one side is switched, and the sheet P is sent to the reversing roller pair 12 rather than the output roller pair 9.

The sheet P conveyed to the reversing roller pair 12 is conveyed in the reverse direction at the timing at which the rear end of the sheet P does not completely pass through, and is conveyed to the reverse conveyance path 11. The sheet P passes through the reverse conveyance path 11 and is conveyed again to the transfer nip in a state where the front and back sides of the sheet P are reversed by the duplex entrance roller pair 13, the duplex intermediate roller pair 14, and the duplex exit roller pair 15 on the reverse conveyance path 11. An image is also transferred to the other side (back side) of the sheet P, is fixed by the fixing device 8, and is ejected by the output roller pair 9 to the outside of the apparatus.

Figure 2:
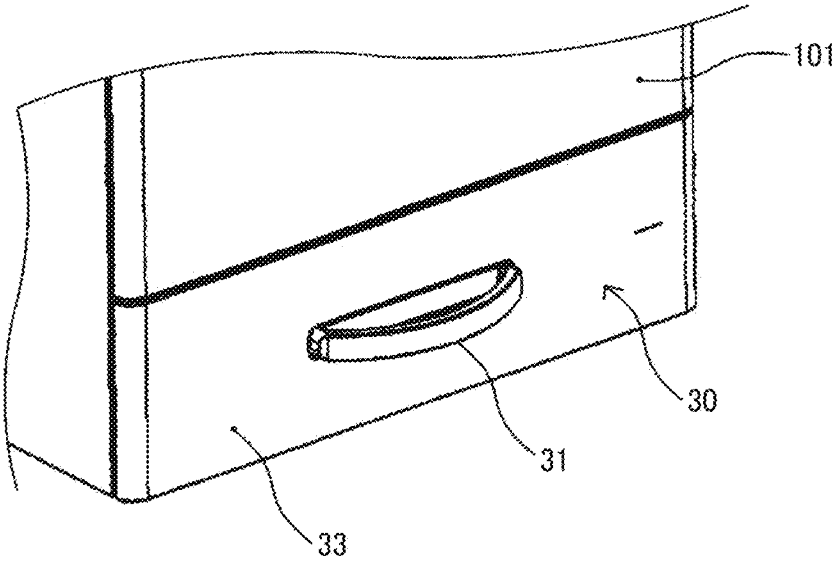
FIG. 2 is a perspective view of a sheet feed tray that is housed in a printer body of the printer in FIG. 1.
Figure 3:
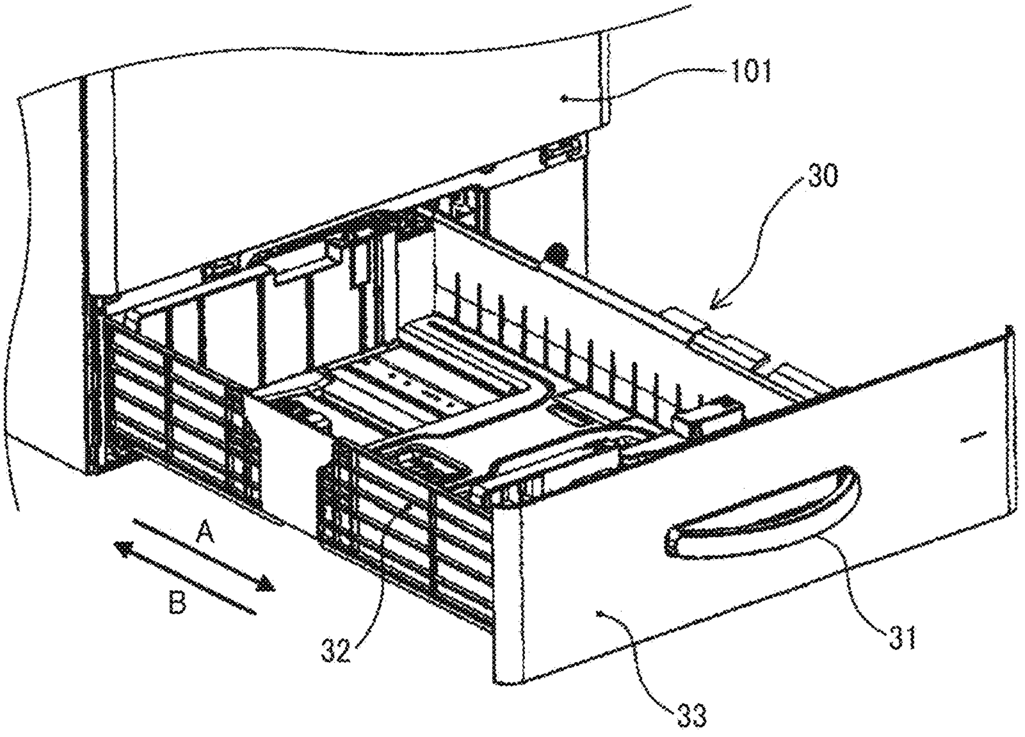
FIG. 3 is a perspective view of the sheet feed tray of FIG. 2 that is pulled out of the printer body in the printer in FIG. 1.

A description is given below of the sheet feeder 3 as a sheet storage device according to the present embodiment. FIG. 2 is a perspective view of a sheet feed tray 30 of the sheet feeder 3 that is housed in a printer body 101 of the printer 100. FIG. 3 is a perspective view of the sheet feed tray 30 that is pulled out (extracted) from the printer body 101.

The sheet feed tray 30 is provided with a handle 31. A user can hold and operate the handle 31 to change the sheet feed tray 30 between a stored state in which the sheet feed tray 30 is stored (inserted) in the printer body 101 as illustrated in FIG. 2 (a closed state of the sheet feed tray 30) and a pull-out state in which the sheet feed tray 30 is pulled out (extracted) to the front of the printer body 101 as illustrated in FIG. 3 (an open state of the sheet feed tray 30).

Figure 4:
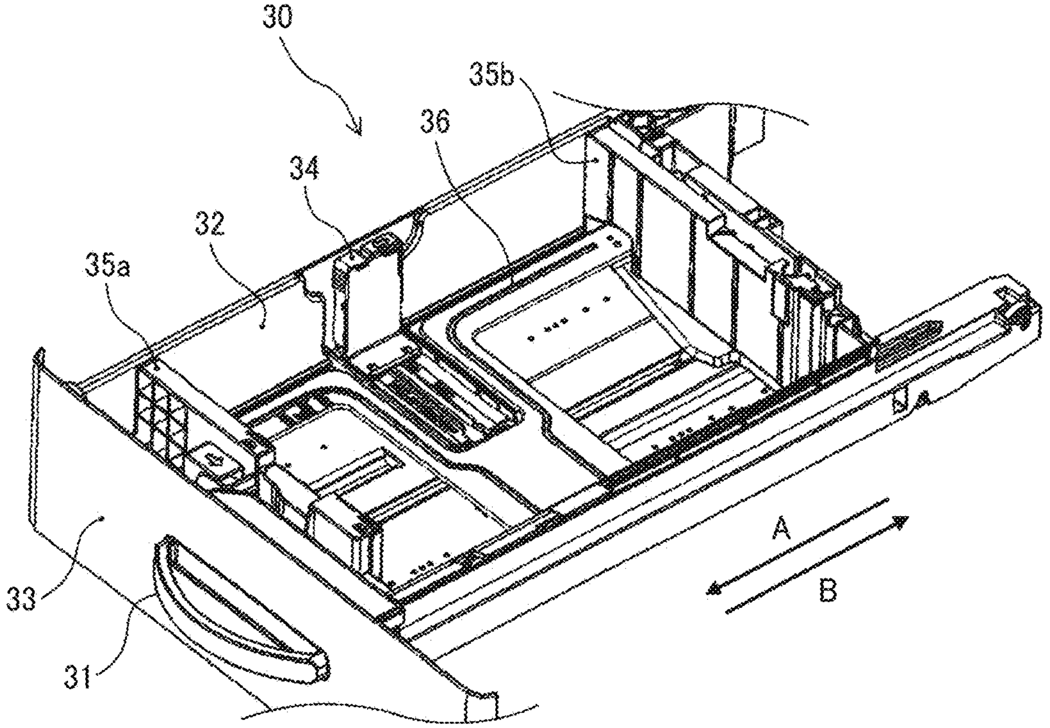
FIG. 4 is a perspective view of the sheet feed tray of FIG. 2.

FIG. 4 is a perspective view of the sheet feed tray 30 according to present embodiment. The sheet feed tray 30 mainly includes a tray portion 32 as a sheet storage that is a basic structure. The tray portion 32 is provided with a tray cover 33 as a cover on the front side of the printer body. The tray portion 32 is provided with the handle 31 used by a user to open and close the sheet feed tray 30. The handle 31 is attached to the tray portion 32 to be slidable (be insertable and removable) along a pull-out direction (extraction direction) A and a storage direction (insertion direction) B of the sheet feed tray 30.

The sheet feed tray 30 can stack sheets P such as sheets of paper, and includes an end fence 34 and side fences 35*a* and 35*b*. The end fence 34 restricts the position of the sheets P stacked in the sheet feed tray 30 in a sheet conveyance direction, and the side fences 35*a* and 35*b* restrict the position of the sheets P in a sheet width direction orthogonal to the sheet conveyance direction. When the sheet feed tray 30 is stored and set in the printer body 101, the stacked sheets P are moved upward by a bottom plate 36 disposed in the sheet feed tray 30 to contact the feed roller 4, and then the sheets P are ready to be fed. The bottom plate 36 is moved upward by a driving force from a drive source such as a motor or by a biasing force of a biasing member such as a spring disposed at a bottom of the bottom plate 36.

Figure 5:
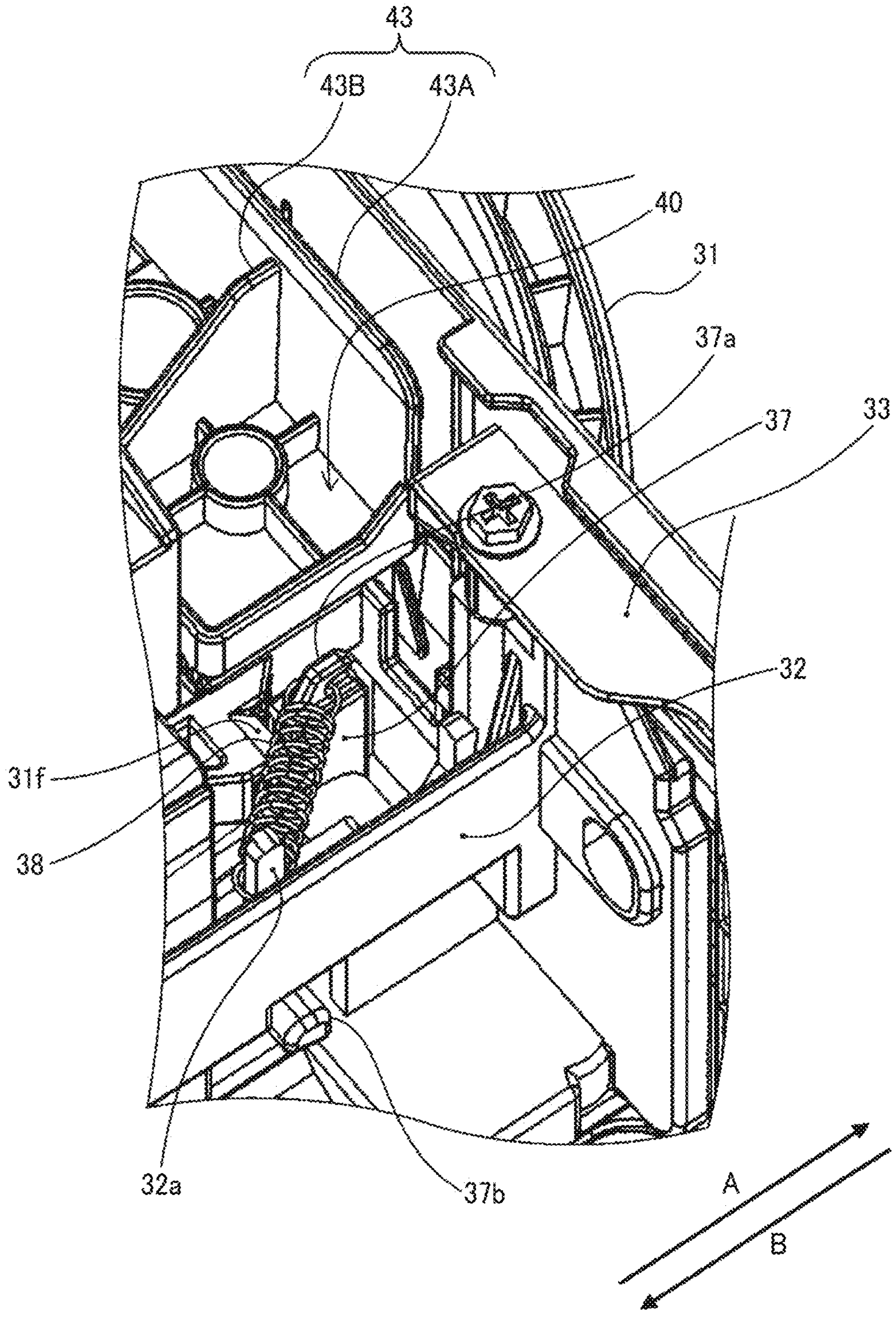
FIG. 5 is a perspective view of the vicinity of a locking mechanism of the sheet feed tray of FIG. 2 as viewed from a lower portion of the printer.
Figure 6A:
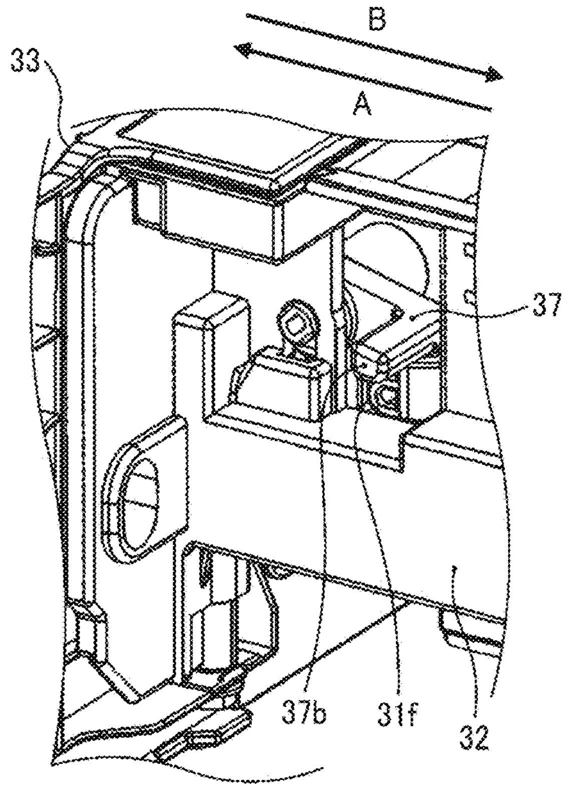
FIG. 6A is a perspective view of the locking mechanism in a lock position as viewed from a lateral side of the printer.
Figure 6B:
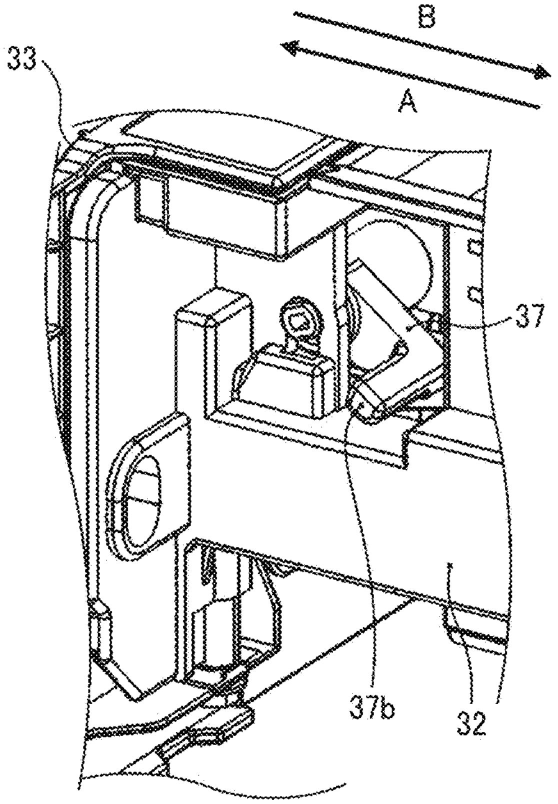
FIG. 6B is a perspective view of the locking mechanism in an unlock position as viewed from the lateral side of the printer.
Figure 7:
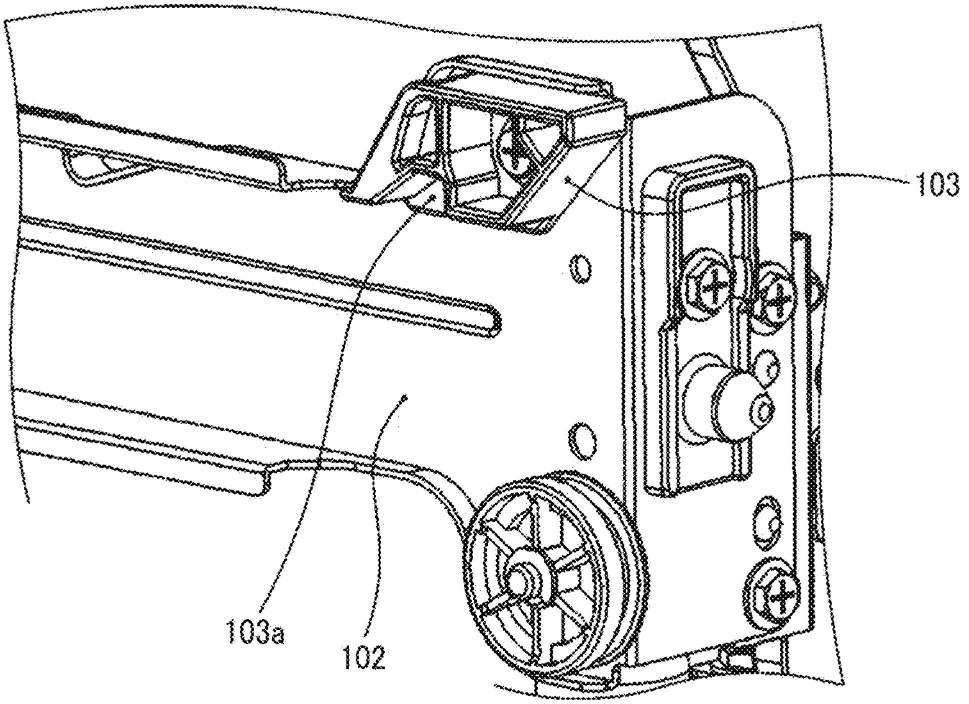
FIG. 7 is a perspective view of a configuration of a printer body for locking the sheet feed tray in a state of being stored in the printer body in conjunction with the locking mechanism of the sheet feed tray.

FIG. 5 is a perspective view of the vicinity of a locking mechanism of the sheet feed tray 30 as viewed from below the printer. FIG. 6A is a perspective view of the locking mechanism in a lock position as viewed from a lateral side of the printer, and FIG. 6B is a perspective view of the locking mechanism in an unlock position as viewed from the lateral side of the printer. FIG. 7 is a perspective view of a configuration of the printer body 101 that locks the sheet feed tray 30 in a state of being stored in the printer body 101 in conjunction with the locking mechanism of the sheet feed tray 30.

As illustrated in FIG. 7, the sheet feed tray 30 is opened and closed along rails 102 disposed in the printer body 101. When the sheet feed tray 30 is stored in the printer body 101, the locking mechanism disposed in the sheet feed tray 30 turns the sheet feed tray 30 into a locked state in which pulling out of the sheet feed tray 30 from the printer body 101 is restricted by the locking mechanism disposed in the sheet feed tray 30.

The locking mechanism of the present embodiment includes a locking lever 37 and a tension spring 38. The locking lever 37 is disposed to rotate with respect to the tray portion 32. The tension spring 38 is attached between a spring attachment end 37*a* of the locking lever 37 and a spring attachment end 32*a* of the tray portion 32. The locking lever 37 can rotate between a lock position (FIG. 6A) at which a lock end 37*b* of the locking lever 37 is raised and an unlock position (FIG. 6B) at which the lock end 37*b* of the locking lever 37 is lowered. When the lock end 37*b* is positioned at the lock position in a state where the sheet feed tray 30 is stored in the printer body 101, the lock end 37*b* enters a groove 103*a* of a stopper 103 disposed in the rail 102 of the printer body 101. With such a configuration, even if the sheet feed tray 30 moves in a direction in which the sheet feed tray 30 is pulled out from the printer body 101, the lock end 37*b* of the sheet feed tray 30 is caught by the stopper 103 of the printer body 101, and thus the sheet feed tray 30 is in a locked state in which pulling out of the sheet feed tray 30 from the printer body 101 is restricted.

The tension spring 38 of the locking mechanism biases the locking lever 37 to rotate in a direction in which the lock end 37*b* of the locking lever 37 moves toward the lock position. The locking lever 37 rotates between the lock position and the unlock position in conjunction with sliding of the handle 31 relative to the tray portion 32.

Figure 8A:
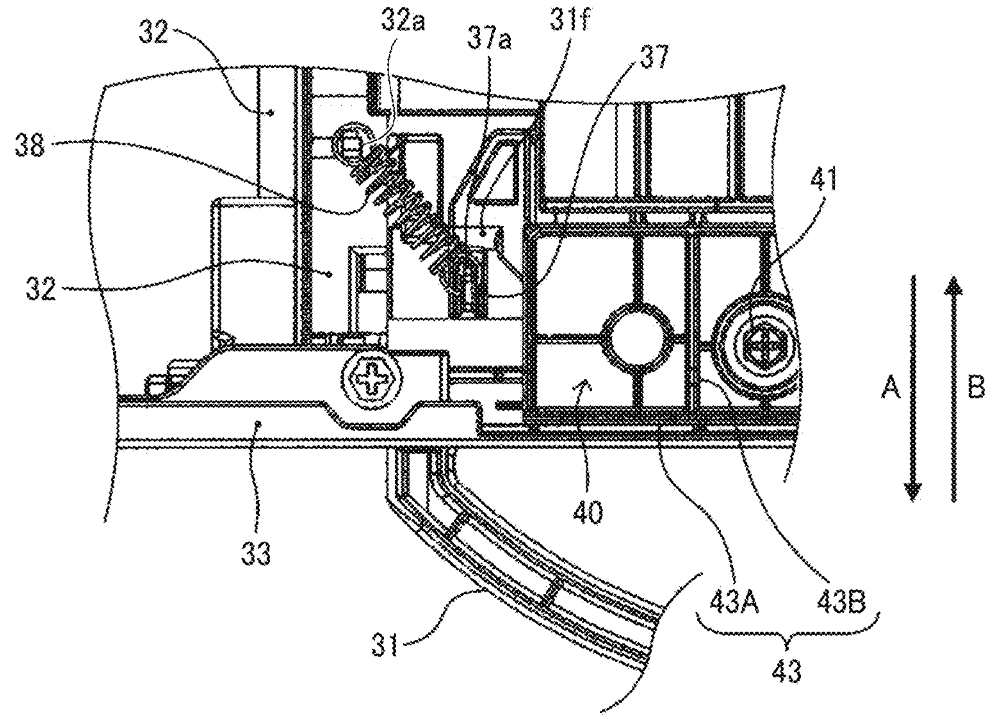
FIG. 8A is a bottom view of a handle in a storage position.
Figure 8B:
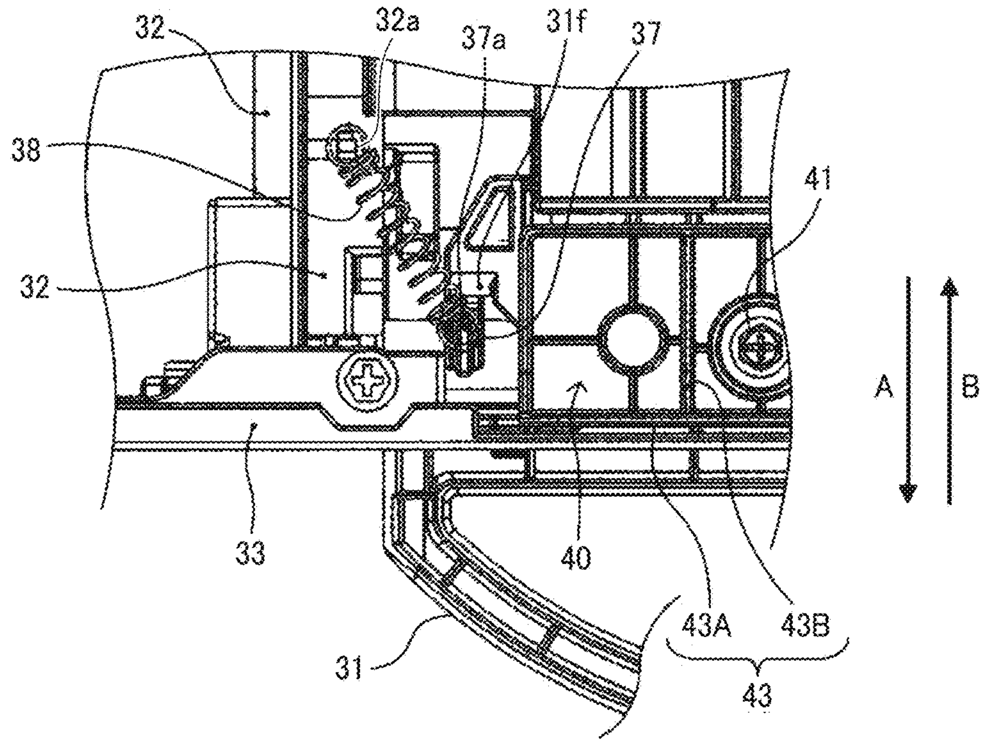
FIG. 8B is a bottom view of the handle in a pull-out position.

FIG. 8A is a bottom view of the handle 31 in a storage position, and FIG. 8B is a bottom view of the handle 31 in a pull-out position. The handle 31 is attached to the tray portion 32 to be movable between the storage position illustrated in FIG. 8A and the pull-out position illustrated in FIG. 8B. The handle 31 is provided with a contact portion 31*f* that contacts the locking lever 37.

When a user operates the handle 31 located at the storage position illustrated in FIG. 8A in a handle pull-out direction A (in the present embodiment, a direction coinciding with the handle pull-out direction A of the sheet feed tray 30), the handle 31 is pulled out to the pull-out position illustrated in FIG. 8B. With such a configuration, the contact portion 31*f* of the handle 31 causes the locking lever 37 to rotate against the biasing force of the tension spring 38, so that the lock end 37*b* of the locking lever 37 moves from the lock position illustrated in FIG. 6A to the unlock position illustrated in FIG. 6B. As a result, the lock end 37*b* comes out of the groove 103*a* of the stopper 103 of the printer body 101, and thus the lock end 37*b* of the sheet feed tray 30 is not caught by the stopper 103 of the printer body 101, resulting in an unlocked state in which the sheet feed tray 30 can be pulled out of the printer body 101.

Figure 9:
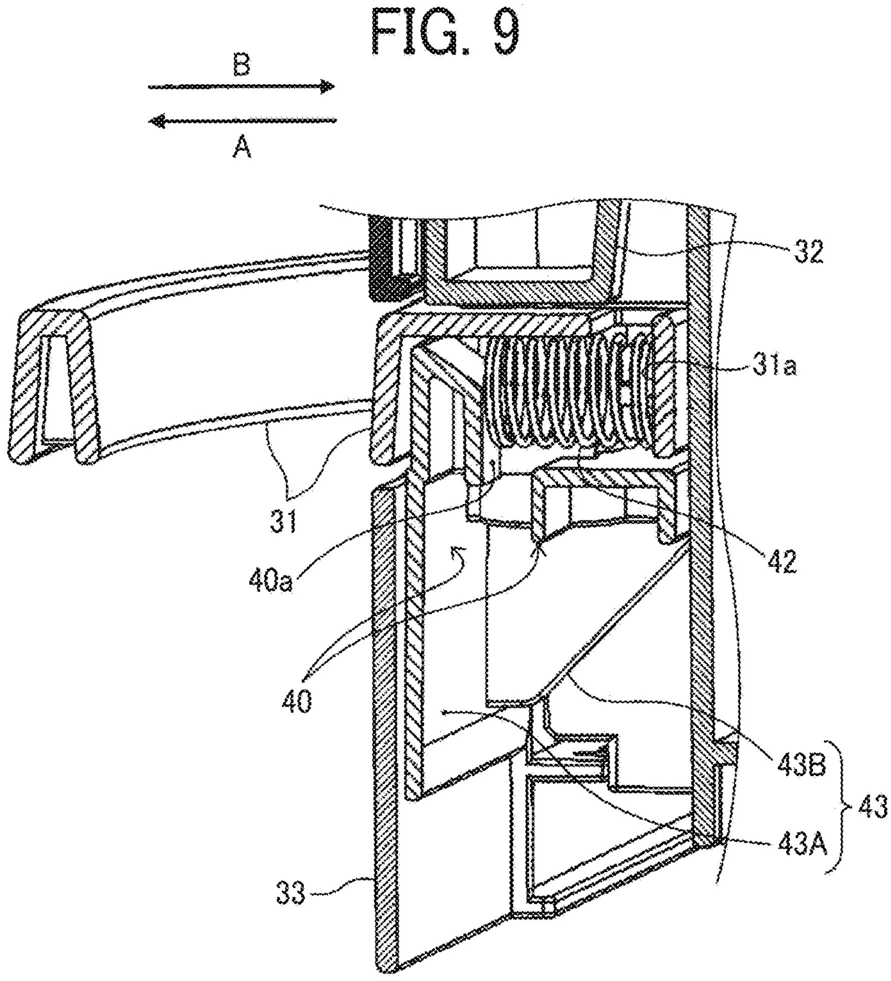
FIG. 9 is a cross-sectional view of the handle and the tray.
Figure 10:
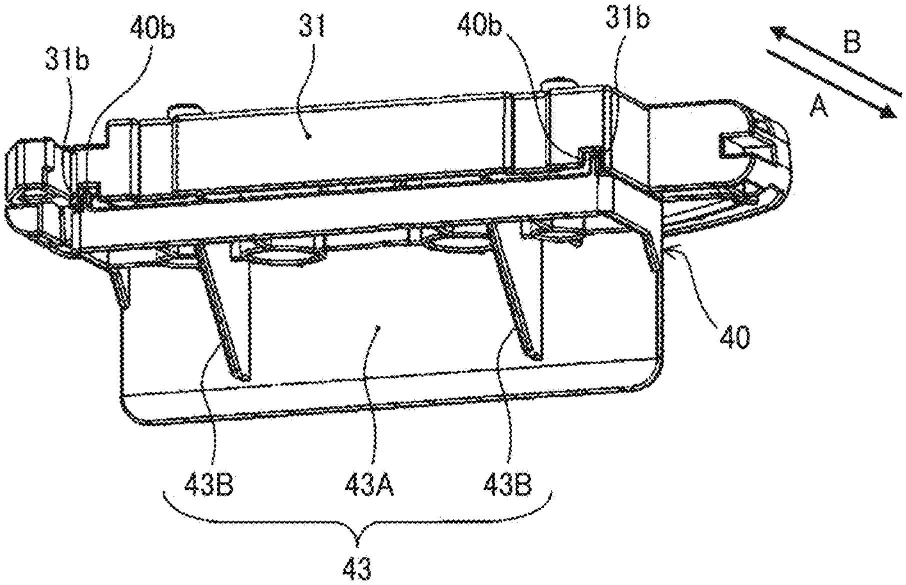
FIG. 10 is a perspective view of a structure in which the handle and a holder are assembled to each other, viewed from an inner side (back side) of the printer body.

FIG. 9 is a cross-sectional view of the handle 31 and the tray portion 32. FIG. 10 is a perspective view of the structure in which the handle 31 and a holder 40 are assembled to each other, viewed from the inner side (back side) of the printer body 101. The sheet feed tray 30 according to the present embodiment is provided with a holder 40 as a handle holder that holds the handle 31 on the tray portion 32 so that the handle 31 does not come out of the tray portion 32 when the handle 31 is attached to the tray portion 32. The holder 40 is disposed to sandwich the handle 31 between the holder 40 and the tray portion 32, and is fixed to the tray portion 32 by a screw 41 illustrated in FIGS. 8A and 8B. Thus, the holder 40 restricts movement (displacement) of the handle 31 in an up and down direction.

As illustrated in FIG. 10, the holder 40 is provided with projections 40*b*, and the projections 40*b* enter recesses 31*b* of the handle 31 as illustrated in FIG. 10 when the handle 31 and the holder 40 are assembled to each other. Thus, the holder 40 also restricts movement (displacement) of the handle 31 in the right and left direction.

A compression spring 42 is attached in a specified compressed state between a handle-side pressing surface 31*a* of the handle 31 and a holder-side pressing surface 40*a* of the holder 40. The compression spring 42 according to the present embodiment has a spiral-spring structure (spring coil structure) in which a wire is spirally wound, but is not limited thereto.

The compression spring 42 biases the handle-side pressing surface 31*a* of the handle 31 toward a handle storage direction B with respect to the holder-side pressing surface 40*a* of the holder 40 fixed to the tray portion 32. Such a configuration constantly applies the biasing force to the handle 31 in the handle storage direction B, and the handle 31 is maintained at the storage position unless the handle 31 is operated in the handle pull-out direction A.

In other words, in the present embodiment, when a user operates the handle 31 in the handle pull-out direction A, the handle 31 moves from the storage position illustrated in FIG. 8A to the pull-out position illustrated in FIG. 8B against the biasing force of the compression spring 42. Accordingly, the locking mechanism turns into an unlock state as described above, and when the user further operates the handle 31 in the handle pull-out direction A as it is, the sheet feed tray 30 is pulled out in the handle pull-out direction A. On the other hand, when the user releases the handle 31, the handle 31 moves from the pull-out position illustrated in FIG. 8B to the storage position illustrated in FIG. 8A by the biasing force of the compression spring 42.

Figure 11A:
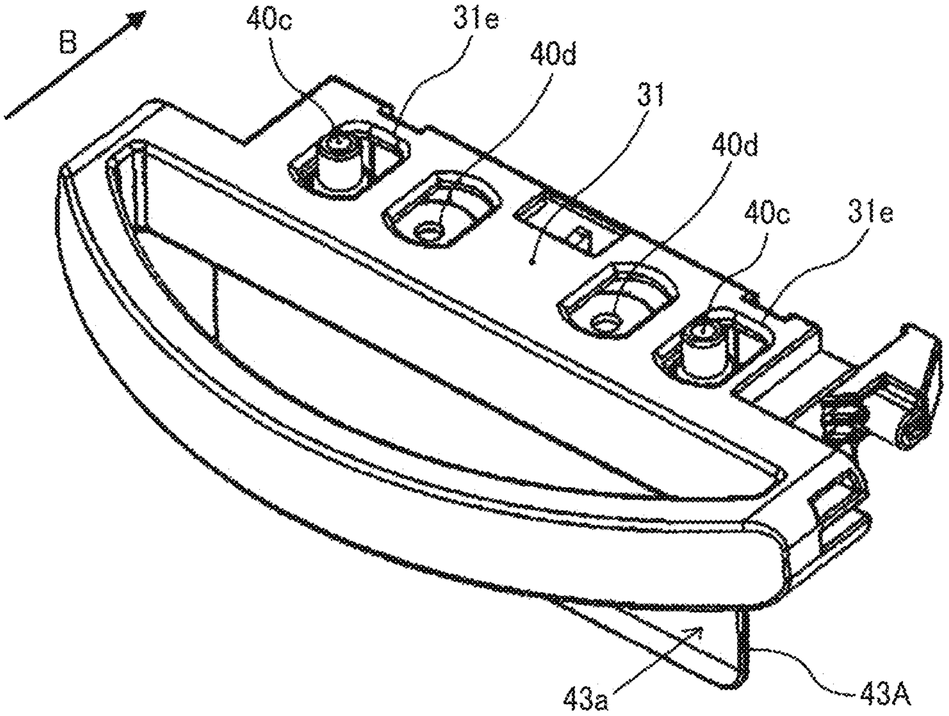
FIG. 11A is a perspective view of the structure illustrated in FIG. 10 when the handle is in a storage position, as viewed from above.
Figure 11B:
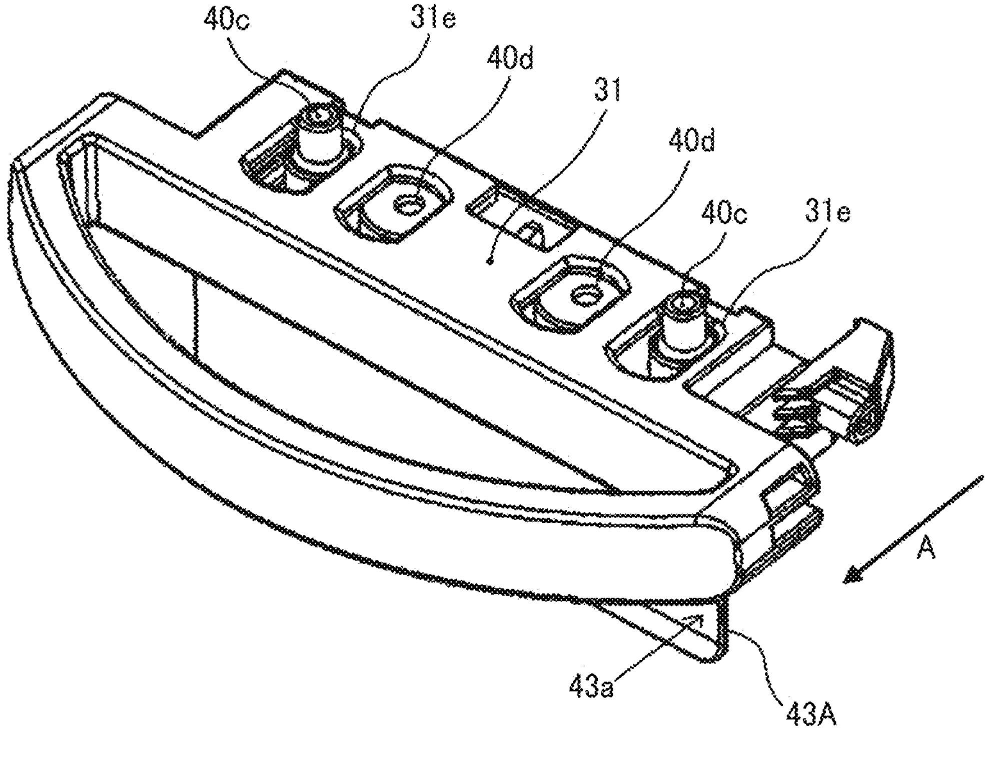
FIG. 11B is a perspective view of the structure illustrated in FIG. 10 when the handle is in a pull-out position, as viewed from above.

FIG. 11A is a perspective view of the structure illustrated in FIG. 10 as viewed from above when the handle 31 is located at the storage position, and FIG. 11B is a perspective view of the structure as viewed from above illustrated in FIG. 10 when the handle 31 is located at the pull-out position. The holder 40 has holes 40*d* that penetrate through in an up and down direction. The screws 41 are passed through the holes 40*d* to screw and fasten the holder 40 to the tray portion 32.

Bosses 40*c* are formed on an upper surface of the holder 40. The bosses 40*c* are inserted in positioning holes of the tray portion 32 so that the holder 40 and the tray portion 32 are positioned to each other. Pull-out restrictors 31*e* that are holes penetrating through in the up and down direction are provided on the upper surface of the handle 31. The bosses 40*c* of the holder 40 are also inserted into the pull-out restrictors 31*e*. When the handle 31 is pulled out to the pull-out position as illustrated in FIG. 11B, the bosses 40*c* of the holder 40 contact the pull-out restrictors 31*e* of the handle 31, so that the handle 31 is restricted to the pull-out position.

As described above, the holder 40 according to the present embodiment performs the function of preventing come-off of the handle 31 and restricting the position of the handle 31.

Figure 12:
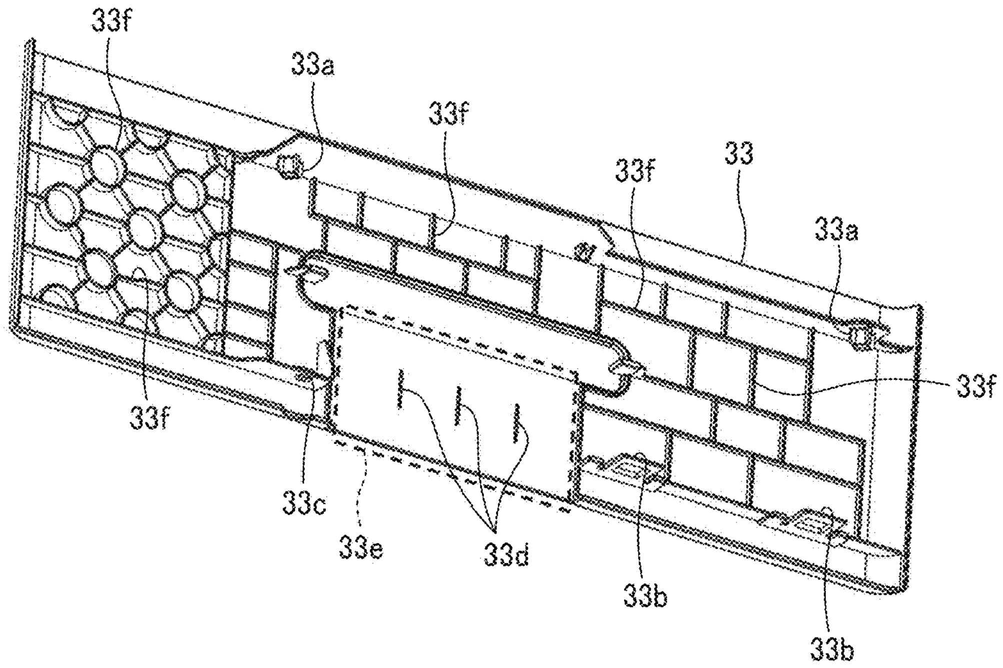
FIG. 12 is a perspective view of a tray cover of the sheet feed tray of FIG. 2 as viewed from an inside (back side) of the printer body.

A description is further given of the structure of the sheet feed tray 30 according to the present embodiment. FIG. 12 is a perspective view of the tray cover 33 of the sheet feed tray 30 according to the present embodiment as viewed from the inside (back side) of the printer body 101. The tray cover 33 is provided with bosses 33*a*. The bosses 33*a* are inserted into positioning holes provided in the tray 32, so that the tray cover 33 is positioned with respect to the tray 32. The tray cover 33 has hook-shaped portions 33*b*. Each of the hook-shaped portions 33*b* is hooked on a projection on the tray portion 32 to restrict the position of the printer body 101 in the front-and-rear direction. The tray cover 33 is provided with a screw hole 33*c*. A screw is fastened to the tray portion 32 through the screw hole 33*c* so that tray cover 33 is fixed to the tray portion 32. As described above, the tray cover 33 is assembled to the tray portion 32 by using the boss 33*a*, the hook-shaped portions 33*b*, and the screw hole 33*c*.

The tray cover 33 is united with the tray portion 32 in the peripheries of the places where the boss 33*a*, the hook-shaped portions 33*b*, and the screw hole 33*c* are disposed, and thus the rigidity of the tray cover 33 is ensured by the rigidity of the tray portion 32. Also in places other than the peripheries of these places, in the present embodiment, as illustrated in FIG. 12, various kinds of rigid reinforcement ribs 33*f* are provided in an allowable range under the constraint such as the size of the apparatus, so that the rigidity of the tray cover 33 is ensured.

In the present embodiment, the rigid reinforcement ribs 33*f* are not disposed in a region surrounded by a dashed line in FIG. 12 (hereinafter referred to as a "non-reinforcement region 33*e*") in order to ensure a space for assembling the holder 40 and a space for the conductive wire when the holder 40 is assembled. In particular, in recent years of an increasing demand for downsizing of printer, reducing the dimension in a front-and-rear direction of the printer is required, so that the rigid reinforcement ribs 33*f* are not disposed in the non-reinforcement region 33*e*.

Figure 13:
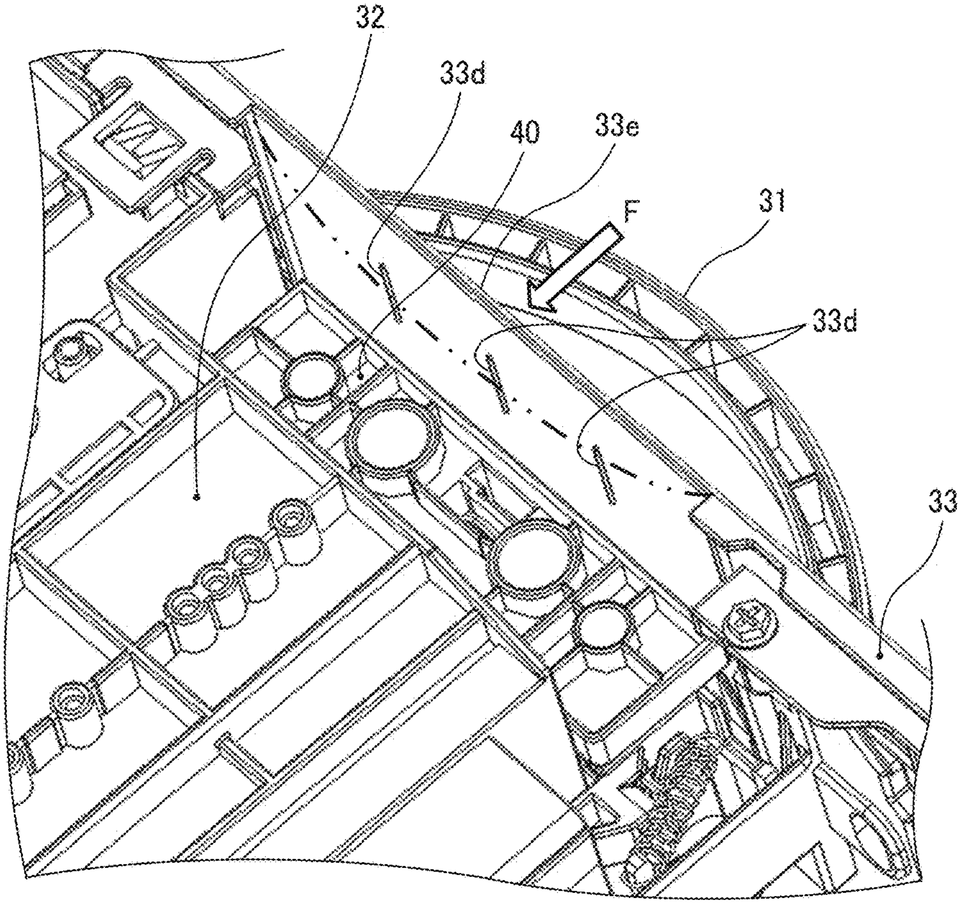
FIG. 13 is a perspective view of a vicinity of the handle of the sheet feed tray when viewed from below in a state where a contact surface member is removed from the holder.
Figure 14:
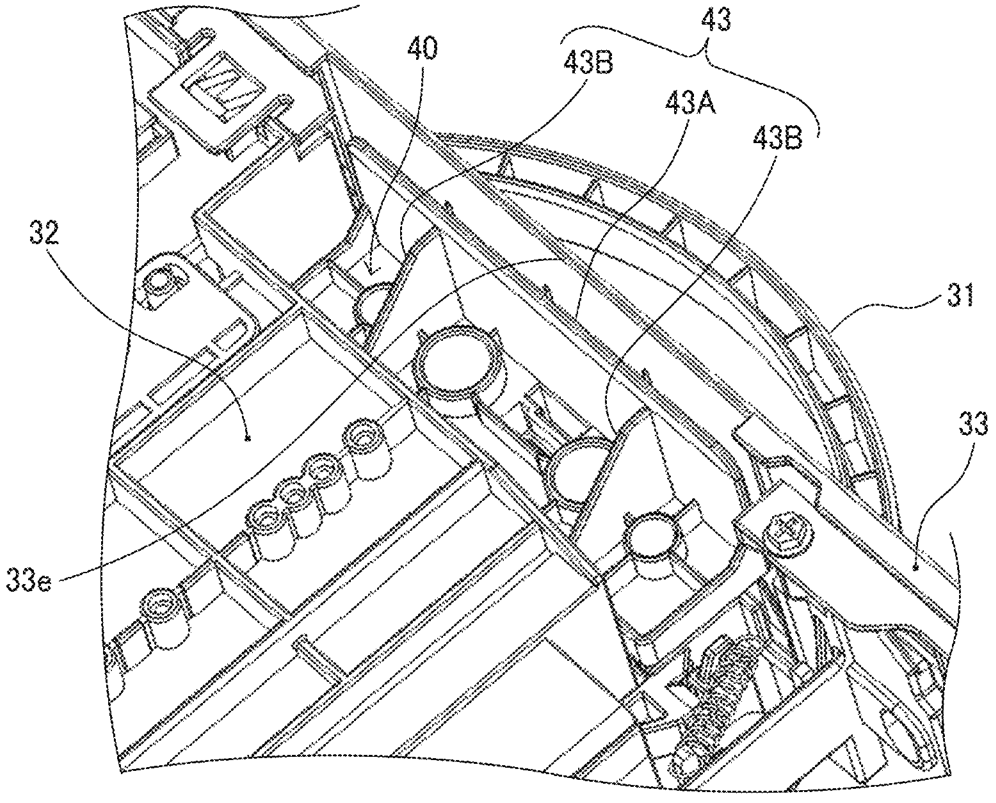
FIG. 14 is a perspective view of the vicinity of the handle of the sheet feed tray as viewed from below.

FIGS. 13 and 14 are perspective views of the vicinity of the handle 31 of the sheet feed tray 30 according to the present embodiment as viewed from below. FIG. 13 illustrates a state where a contact surface member 43 is removed from the holder 40 for convenience of explanation. In the sheet feed tray 30 including the handle 31 as in the present embodiment, the handle 31 is usually pulled out by a user to remove the sheet feed tray 30 from the printer body, and the handle 31 is pushed by a user to insert the sheet feed tray 30 into the printer body. When the sheet feed tray 30 is inserted into the printer body, a user may press the tray cover 33 instead of the handle 31 to insert the sheet feed tray 30 into the printer body.

The tray cover 33 may have a structure with low rigidity, such as a thin resin plate, in order to respond to, for example, downsizing or weight reduction of the printer. In this case, as described above, when a user pushes the tray cover 33 instead of the handle 31 to insert the sheet feed tray 30 into the printer body, the pressing force F may cause the tray cover 33 to bend toward the tray portion 32 as indicated by a long dashed double-short dashed line in FIG. 13. In particular, in the present embodiment, no rigid reinforcement rib 33*f* can be provided in the non-reinforcement region 33*e* of the tray cover 33 in the vicinity of the handle 31, and thus when a user pushes the non-reinforcement region 33*e*, the non-reinforcement region 33*e* of the tray cover 33 may be easily bent toward the tray portion 32.

Accordingly, in the present embodiment, as illustrated in FIG. 14, the contact surface member 43 is disposed on the holder 40 arranged between the tray cover 33 and the tray portion 32 as a deformation restrictor that restricts deformation of the non-reinforcement region 33*e* of the tray cover 33 toward the tray portion 32. The contact surface member 43 has a contact surface 43*a* (see FIG. 11) with which the non-reinforcement region 33*e* of the tray cover 33 that bends toward the tray portion 32 contacts.

In the present embodiment, even if the non-reinforcement region 33*e* of the tray cover 33 bends due to pushing by a user, the non-reinforcement region 33*e* contacts the contact surface 43*a* of the contact surface member 43 of the holder 40, and thus the deformation of the non-reinforcement region 33*e* is prevented. In other words, in the present embodiment, the holder 40 for holding the handle 31 to the tray portion 32 is used to restrict the deflection of the non-reinforcement region 33*e* of the tray cover 33 due to pushing by a user. Thus, according to the present embodiment, even in a case of the tray cover 33 having low rigidity, the deformation of the tray cover 33 due to pushing by a user can be reduced without arranging an additional reinforcement member for reinforcing the tray cover 33.

Figure 15A:
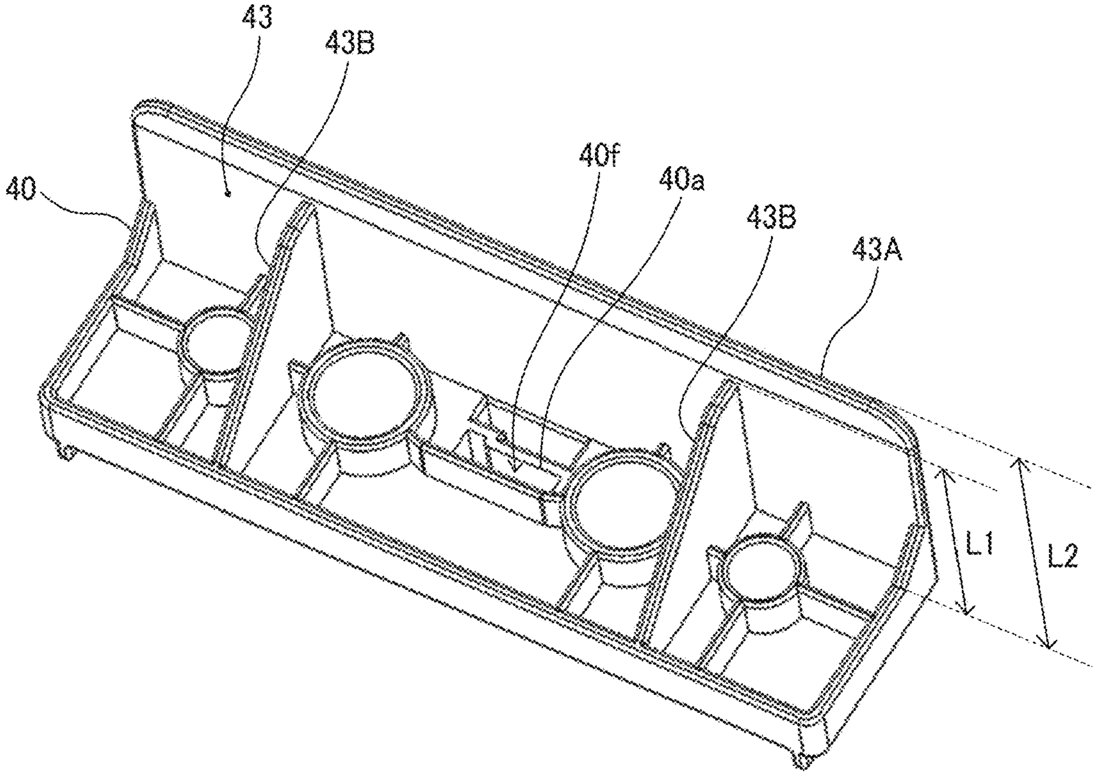
FIG. 15A is a perspective view of the holder as viewed from below.
Figure 15B:
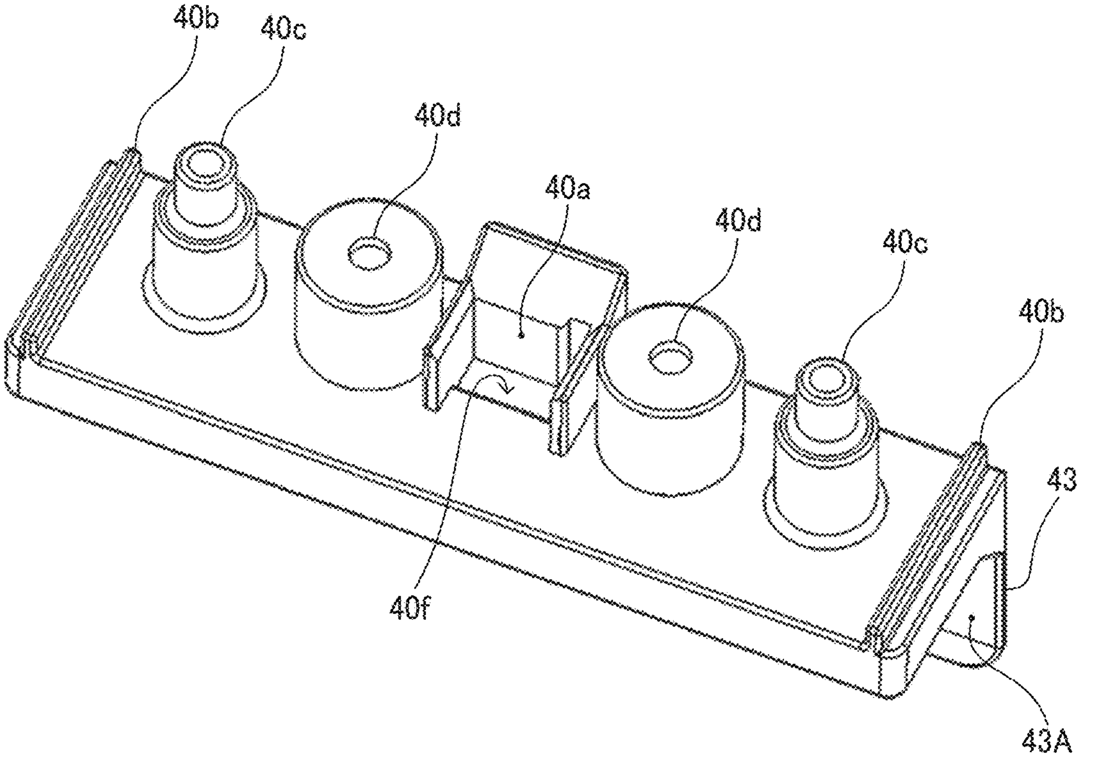
FIG. 15B is a perspective view of the holder as viewed from above.

FIG. 15A is a perspective view of the holder 40 as viewed from below, and FIG. 15B is a perspective view of the holder 40 as viewed from above. The contact surface member 43 of the holder 40 according to the present embodiment includes a plate 43A that forms the contact surface 43*a*, and two reinforcement ribs 43B formed on a surface opposite to the contact surface 43*a* in the plate 43A. Such reinforcement ribs 43B are provided so that the rigidity of the plate 43A with which the tray cover 33 comes into contact due to pushing by a user.

A length L1 of the reinforcement rib 43B is preferably not less than half of a length L2 of the region of the contact surface 43*a* in a longitudinal direction of the reinforcement rib 43B (the up and down direction in FIG. 15A). With such a configuration, sufficient rigidity of the plate 43A with which the tray cover 33 comes into contact due to pushing by a user is ensured, and deformation of the non-reinforcement region 33*e* of the tray cover 33 due to pushing by a user can be reduced.

The number of reinforcement ribs 43B may be determined according to the width of the plate 43A of the holder 40 (the length of the plate 43A in the direction orthogonal to the direction of the length L1 of the reinforcement rib 43B and parallel to the contact surface 43*a*). However, the number is preferable to be two or more. With such a configuration, sufficient rigidity of the plate 43A with which the tray cover 33 comes into contact due to pushing by a user is ensured, and deformation of the non-reinforcement region 33*e* of the tray cover 33 due to pushing by a user can be reduced.

As illustrated in FIGS. 15A and 15B, the holder 40 of the present embodiment is provided with a viewing window 40*f* that is a through hole for viewing the compression spring 42 from the outside of the tray portion 32 after assembly is completed. Without such a viewing window 40*f*, the compression spring 42 is not viewed after the holder 40 is assembled, and thus confirming whether the compression spring 42 is properly attached may be difficult. As in the present embodiment, the viewing window 40*f* is provided to facilitate checking whether, for example, the compression spring 42 is appropriately attached or whether there is a shortage of the compression spring 42, after the holder 40 is assembled.

Figure 17:
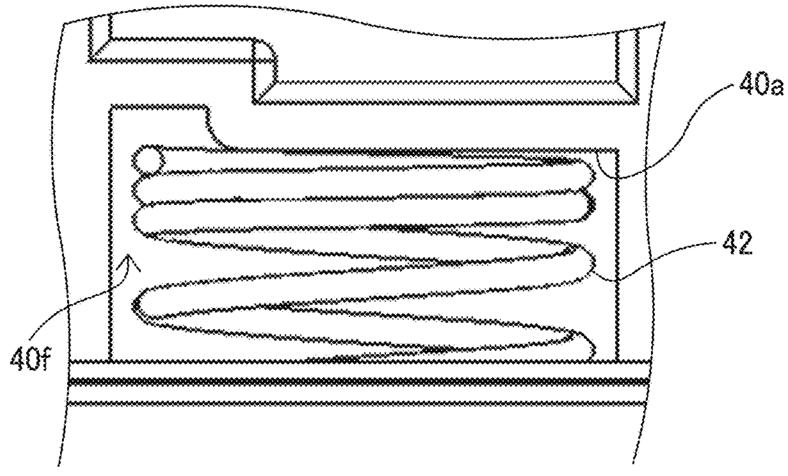
FIG. 17 is a schematic view of a compression spring disposed in the holder viewed from a viewing window.

In particular, as illustrated in FIG. 17, the viewing window 40*f* according to the present embodiment is provided so that a contact portion between the other end of the compression spring 42 and the holder-side pressing surface 40*a* is visible, and thus the state of the other end of the compression spring 42 that contacts the holder-side pressing surface 40*a* can be viewed after assembly. With such a configuration, a condition of the other end of the compression spring 42, which is particularly important for checking the attachment condition of the compression spring 42, can be viewed, thus facilitating accurate determination of whether the compression spring 42 is appropriately attached.

The viewing window 40*f* of the present embodiment is formed between the reinforcement ribs 43B. As a result, workability when an operator assembles the holder 40 is enhanced. Specifically, when an operator assembles the holder 40 at a predetermined position of the tray portion 32 with gripping the reinforcement ribs 43B, the operator can assemble the holder 40 while checking the position of the compression spring 42 temporarily held by the handle 31 in advance.

Figure 16:
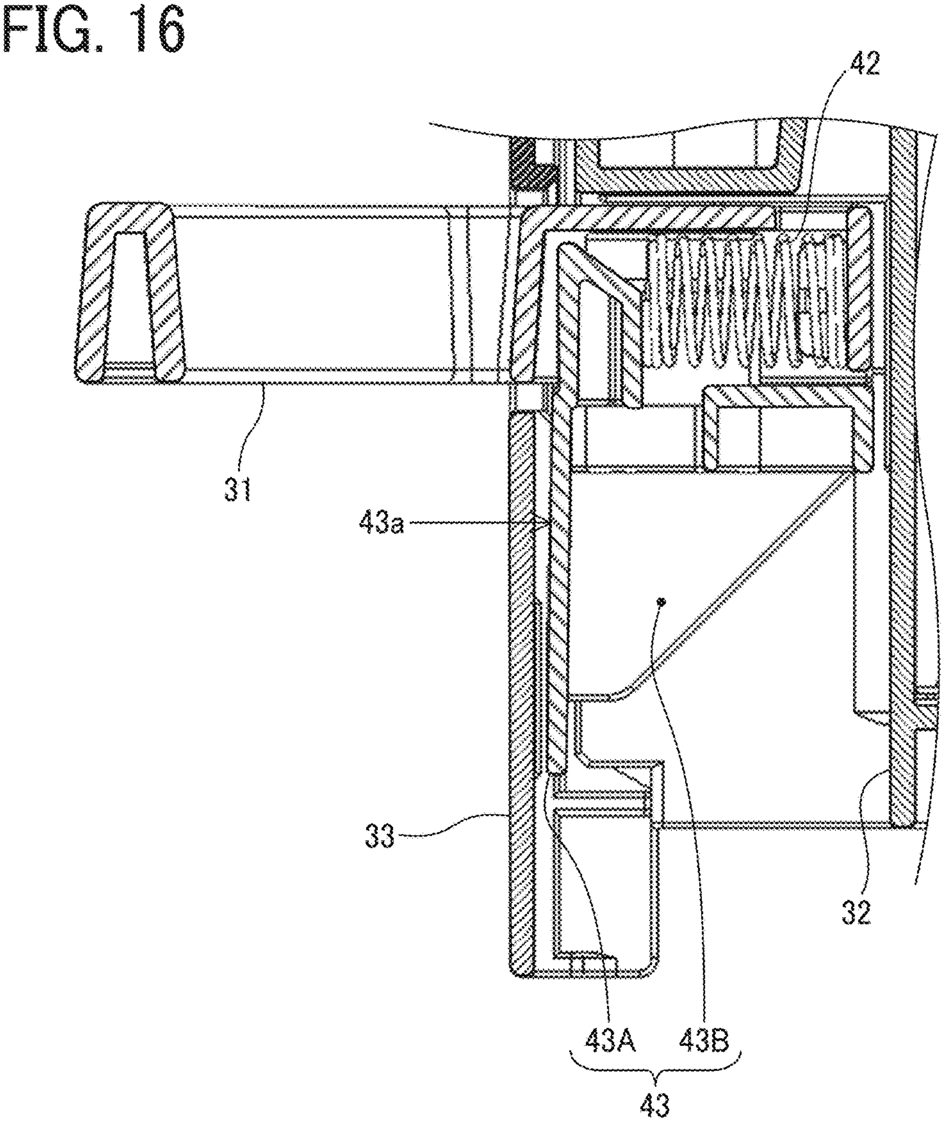
FIG. 16 is a cross-sectional view illustrating the vicinity of the handle of the sheet feed tray.

In a case where the holder 40 is a resin component manufactured by injection molding, a draft angle is required for molding with a mold, and thus the contact surface 43*a* of the contact surface member 43 of the holder 40 may be formed not vertically but slightly obliquely with respect to the base of the holder 40. In this case, as illustrated in FIG. 16, the tip (the end on the lower portion of the apparatus) of the contact surface 43*a* of the contact surface member 43 is positioned closer to the tray cover 33 than the base of the holder 40. At this time, the tray cover 33 of the present embodiment is provided with a contact rib 33*d* as a projection that contacts the contact surface 43*a* of the contact surface member 43 so that the tray cover 33 contacts a portion of the non-reinforcement region 33*e* positioned closest to the tray cover 33 when the non-reinforcement region 33*e* of the tray cover 33 is deformed due to pushing by a user. As a result, the deformation amount of the non-reinforcement region 33*e* of the tray cover 33 due to pushing by a user can be reduced, and thus the deformation can be further restricted.

The above-described embodiments are given as examples, and, for example, the following aspects of the present disclosure may have advantageous effects described below.

First Aspect

A sheet storage device (e.g., the sheet feed tray 30) includes a sheet storage (e.g., the tray portion 32), a handle (e.g., the handle 31), a cover (e.g., the tray cover 33), and a handle holder (e.g., the holder 40). The sheet storage is insertable into and removable from an apparatus body (e.g., the printer body 101). The handle is operated by a user when the sheet storage is inserted into and removed from the apparatus body. The cover is attached in front of the sheet storage in a removal direction of the sheet storage. The handle holder that holds the handle on the sheet storage is disposed between the cover and the sheet storage. The handle holder has a deformation restrictor (e.g., the contact surface member 43) that restricts deformation of the cover toward the sheet storage. In the sheet storage device including a handle, a user usually pulls the handle to pull out the sheet storage from the apparatus body, and pushes the handle to insert the sheet storage into the apparatus body. However, when the sheet storage is inserted into the apparatus body, a user may push the cover instead of the handle to insert the sheet storage into the apparatus body. Accordingly, in a case where a cover having low rigidity is used in order to respond to, for example, downsizing or weight reduction of the apparatus, the cover may be bent due to pushing by a user. The sheet storage device according to the present aspect is a sheet storage device in which the handle holder that holds the handle to the sheet storage is disposed between the cover and the sheet storage. In the first aspect, the handle holder is provided with a deformation restrictor that restricts deformation of the cover toward the sheet storage. With such a configuration, the handle holder can be used to prevent the cover from being bent due to pushing by a user. As a result, even if a cover having low rigidity is used, deformation of the cover due to the pushing by the user can be reduced without arranging an additional reinforcement member for reinforcing the rigidity of the cover.

Second Aspect

In the sheet storage device (e.g., the sheet feed tray 30) according to the first aspect, the deformation restrictor (e.g., the contact surface member 43) is a contact surface member having a contact surface (e.g., the contact surface 43*a*) that the cover (e.g., the tray cover 33) contacts when the cover is bent toward the sheet storage. With such a configuration, the deformation restrictor can be achieved with a simple configuration.

Third Aspect

In the sheet storage device (e.g., the sheet feed tray 30) according to the second aspect, the contact surface member includes a plate (e.g., the plate 43A) that forms the contact surface (e.g., the contact surface 43*a*), and a reinforcement rib (e.g., the reinforcement rib 43B) that is formed on a surface of the plate opposite to the contact surface. With such a configuration, the rigidity of the plate with which the cover comes in contact due to pushing by a user can be enhanced, and the deformation of the cover due to pushing by a user can be stably reduced.

Fourth Aspect

In the sheet storage device (e.g., the sheet feed tray 30) according to the third aspect, a length (e.g., the length L1) of the reinforcement rib (e.g., the reinforcement rib 43B) on the opposite surface is equal to or more than half of a region length (e.g., the length L2) of the contact surface (e.g., the contact surface 43*a*) in a longitudinal direction of the reinforcement rib. With such a configuration, the rigidity of the plate with which the cover comes into contact due to pushing by a user is sufficiently ensured, so that the deformation of the cover due to pushing by a user can be reduced more stably.

Fifth Aspect

In the sheet storage device (e.g., the sheet feed tray 30) according to the third or fourth aspect, the number of reinforcement ribs (e.g., the reinforcement rib 43B) formed on the opposite surface is two or more. With such a configuration, the rigidity of the plate with which the cover comes into contact due to pushing by a user is sufficiently ensured, so that the deformation of the cover due to pushing by a user can be reduced more stably.

Sixth Aspect

The sheet storage device (e.g., the sheet feed tray 30) according to the fifth aspect includes a compression spring (e.g., the compression spring 42) that biases the handle (e.g., the handle 31) in a direction opposite to the removal direction of the sheet storage. The compression spring is disposed between the handle and the handle holder (e.g., the holder 40). The handle holder has a viewing window (e.g., the viewing window 40*f*) through which the compression spring is visible from the outside of the sheet storage (e.g., the tray portion 32). The viewing window is formed between the two or more reinforcement ribs (e.g., the reinforcement rib 43B). With such a configuration, workability when an operator assembles the handle holder is enhanced.

Seventh Aspect

In the sheet storage device (e.g., the sheet feed tray 30) according to any one of the second to sixth aspects, the cover (e.g., the tray cover 33) is provided with a projection (e.g., the contact rib 33*d*) to contact the contact surface (e.g., the contact surface 43*a*). With such a configuration, the deformation amount of the cover due to pushing by a user can be reduced, and deformation can be further restricted.

Eighth Aspect

An image forming apparatus includes the sheet storage device (e.g., the sheet feed tray 30) according to any one of the first to seventh aspects. With such a configuration, an image forming apparatus can be provided in which, even when a cover (e.g., the tray cover 33) having low rigidity is used, deformation of the cover due to pushing by a user can be reduced without providing a new reinforcement member for reinforcing the cover.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A sheet storage device comprising:

a sheet storage configured to be insertable into and removable from an apparatus body;

a handle configured to insert and remove the sheet storage into and from the apparatus body;

a cover attached in front of the sheet storage in a removal direction of the sheet storage; and a handle holder configured to hold the handle on the sheet storage, the handle holder being between the cover and the sheet storage, the handle holder having a restrictor that is configured to restrict deformation of the cover toward the sheet storage, and the handle holder being configured to movably hold the handle between a storage position and a removal position in the removal direction of the sheet storage.

2. The sheet storage device according to claim 1, wherein the restrictor is a contact surface member having a contact surface configured to contact the cover in response to the cover being bent toward the sheet storage.

3. The sheet storage device according to claim 2, wherein the contact surface member includes:

a plate having the contact surface and a first surface opposite the contact surface; and a reinforcement rib on the first surface of the plate.

4. The sheet storage device according to claim 3, wherein a length of the reinforcement rib on the first surface is equal to or more than half of a length of the contact surface in a longitudinal direction of the reinforcement rib.

5. The sheet storage device according to claim 2, wherein the contact surface member includes:

a plate having the contact surface and a first surface opposite the contact surface; and two or more reinforcement ribs on the first surface of the plate.

6. The sheet storage device according to claim 5, further comprising a compression spring configured to bias the handle in a direction opposite to the removal direction of the sheet storage, the compression spring being between the handle and the handle holder, wherein the handle holder defines a viewing window through which the compression spring is visible from outside of the sheet storage, and wherein the viewing window is defined between the two or more reinforcement ribs.

7. The sheet storage device according to claim 2, wherein the cover includes a projection configured to contact the contact surface.

8. The sheet storage device according to claim 1, further comprising a spring configured to bias the handle in a direction opposite to the removal direction of the sheet storage.

9. The sheet storage device according to claim 8, wherein the spring is between a first contact surface near the handle and a second contact surface near the handle holder in a compression state.

10. An image forming apparatus comprising the sheet storage device according to claim 1.

11. A sheet storage device comprising:

a sheet storage configured to be insertable into and removable from an apparatus body;

a handle configured to insert and remove the sheet storage into and from the apparatus body;

a cover attached in front of the sheet storage in a removal direction of the sheet storage;

a handle holder configured to hold the handle on the sheet storage, the handle holder being between the cover and the sheet storage, the handle holder having a restrictor configured to restrict deformation of the cover toward the sheet storage; and a compression spring configured to bias the handle in a direction opposite to the removal direction of the sheet storage, the compression spring being between the handle and the handle holder, wherein the restrictor is a contact surface member having a contact surface configured to contact the cover in response to the cover being bent toward the sheet storage, the contact surface member includes, a plate including the contact surface and a first surface opposite the contact surface, and two or more reinforcement ribs on the first surface of the plate, the handle holder defines a viewing window through which the compression spring is visible from outside of the sheet storage, and the viewing window is defined between the two or more reinforcement ribs.

* * * * *